United States Patent [19]
Girault et al.

[11] 3,806,599
[45] Apr. 23, 1974

[54] METHOD FOR TREATING TOPICAL BACTERIAL OR FUNGAL INFECTIONS

[75] Inventors: Pierre Girault, Paris; Guy Hagemann, Nogent-sur-Marne, both of France

[73] Assignee: Roussel Uclaf, Paris, France

[22] Filed: Aug. 4, 1972

[21] Appl. No.: 277,924

Related U.S. Application Data
[62] Division of Ser. No. 134,063, April 14, 1971, abandoned.

[30] Foreign Application Priority Data
Apr. 22, 1970 France .............................. 70.14574

[52] U.S. Cl. ................................................. 424/302
[51] Int. Cl. ............................................ A61k 27/00
[58] Field of Search ................................. 424/302

[56] References Cited
UNITED STATES PATENTS
3,266,982   8/1966   Popoff ............................ 424/322
3,497,541   2/1970   Martin et al. ..................... 260/453

FOREIGN PATENTS OR APPLICATIONS
4,017,794   8/1965   Japan ............................. 260/454

Primary Examiner—Jerome D. Goldberg
Attorney, Agent, or Firm—Hammond & Littell

[57] ABSTRACT

Novel 3-chloro-4-thiocyanophenyl ureas of the formula

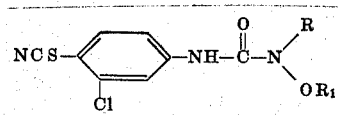

wherein R and $R_1$ can be the same or different and are selected from the group consisting of lower alkyl of one to seven carbon atoms and lower alkenyl of two to seven carbon atoms and taken together form an alkylene radical of three to five carbon atoms which have anti-bacterial and anti-fungal activity and their preparation.

3 Claims, No Drawings

METHOD FOR TREATING TOPICAL BACTERIAL OR FUNGAL INFECTIONS

PRIOR APPLICATION

This application is a division of copending application Ser. No. 134,063 filed Apr. 14, 1971, now abandoned.

OBJECTS OF THE INVENTION

It is an object of the invention to provide novel ureas of formula I.

It is another object of the invention to provide a novel process for the preparation of the ureas of formula I.

It is a further object of the invention to provide novel antibacterial and antifungal compositions.

It is an additional object of the invention to provide a novel method of combatting bacteria and fungus.

These and other objects and advantages of the invention will become obvious from the following detailed description.

THE INVENTION

The novel ureas of the invention have the formula

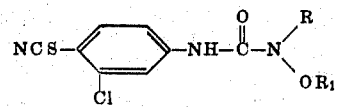

wherein R and $R_1$ can be the same or different and are selected from the group consisting of lower alkyl of one to seven carbon atoms and lower alkenyl of two to seven carbon atoms and taken together form an alkylene radical of three to five carbon atoms.

The compounds of formula I are therapeutically useful as antibacterial agents particularly against gram positive bacteria and have a high antifungal activity while possessing a very low toxicity. They are particularly useful for combatting infections due to Candida or Trichophyton. Particularly useful are N-methoxy-N-methyl-N'-(3-chloro-4-thiocyanophenyl) urea, N-methoxy-N-allyl-N'-(3-chloro-4-thiocyanophenyl) urea and N-[(3-chloro-4-thiocyanophenyl) carbamoyl]-isoxazolidine.

The novel process of the invention for the preparation of ureas of formula I comprising reacting 3-chloro-4-thiocyanoaniline with a functional derivative of N—R—N—$OR_1$ carbamic acid in a basic medium. The functional derivative of the said carbamic acid may be an acid halide such as its chloride or a lower alkyl ester such as the ethyl ester.

The basic agent may be an aliphatic, aromatic or arylaliphatic tertiary amine such as triethylamine, pyridine, collidine, dimethylaniline or 4-dimethylaminopyridine. The condensation reaction is preferably effected in an organic solvent such as tetrahydrofuran, aromatic hydrocarbons, i.e., benzene, xylene or toluene and dialkylamides of aliphatic acids such as dimethylformamide or dimethylacetamide. The reaction is preferably effected with heating most preferably at the reflux temperature of the organic solvent, for 1 to 24 hours.

Preferably, 3-chloro-4-thiocyanoaniline is condensed with N-methyl-N-methoxy-carbamoyl chloride or N-chlorocarbonyl-isoxazolidine in benzene in the presence of triethylamine to form N-methoxy-N-methyl-N'-(3-chloro-4-thiocyanophenyl) urea and N-[(3-chloro-4-thiocyanophenyl)carbamoyl]-isoxazolidine, respectively. Preferably, N-methoxy-N-allyl-N'-(3-chloro-4-thiocyanophenyl) urea is prepared by reacting 3-chloro-4-thiocyanoaniline with ethyl N-methoxy-N-allyl -carbamate in toluene in the presence of pyridine and N-allyloxy-N-allyl-N'-(3-chloro-4-thiocyanophenyl) urea may be prepared by reacting 3-chloro-4-thiocyanoaniline with N-allyl-N-allyloxy-carbamoyl chloride (described in Belgian Pat. No. 733,024) in a toluene media in the presence of triethylamine or dimethylaniline.

The novel antibacterial and antifungal compositions are comprised of an effective amount of a compound of formula I and a topical pharmaceutical carrier. The compositions may be in the form of creams, gels, pomades, colutorium, topical powders or solutions or suspensions in aerosols. Preferably the compositions are used as creams or pomades containing 0.5 to 15 percent by weight of the active compound of formula I. These compositions may be applied one to four times a day.

The novel method of combatting topical bacterial and fungal infections in warm-blooded animals comprises administering topically to warm-blooded animals an effective amount of a compound of formula I. The effective amount will depend on the complaint being treated. The compositions are administered topically to the skin or mucous membrane of the animals.

In the following examples there are described several preferred embodiments to illustrate the invention. However, it should be understood that the invention is not intended to be limited to the specific embodiments.

EXAMPLE I

Preparation of N-methoxy-N-methyl-N'-(3-chloro-4-thiocyanophenyl)-urea

Step A: 3-chloro-4-thiocyano-aniline 86 cc of bromine and 300 cc of a saturated methanol solution of sodium bromide were added to a mixture of 193 g of m-chloro-aniline, 345 g of ammonium thiocyanate and 900 cc of methanol cooled to 5°C and the reaction mixture was stirred for 15 hours at room temperature and then was poured into water. The mixture was neutralized by addition of sodium bicarbonate, vacuum filtered and the recovered precipitate was washed with water and dried under reduced pressure. The residue was crystallized from isopropyl ether to obtain 70 g of 3-chloro-4-thiocyano-aniline melting at 74°C. The product occurred as a pale yellow solid soluble in ethanol, chloroform and acetone, slightly soluble in ether and benzene and insoluble in water.

Analysis: $C_7H_5ClN_2S$; molecular weight = 184.66

Calculated: % C 45.52 % H 2.73 % Cl 19.20 % N 15.17 % S 17.37

Found: % C 45.6 H 3.0 Cl 19.4 N 14.8 S 17.5

IR Spectrum:

Presence of $NH_2$ at 3,492 and 3,400 $cm^{-1}$; presence of S—C≡N at 2,160 $cm^{-1}$ and presence of aromatic.

The compound is identical to that obtained by Takahashi, Yakugaku Zashi; Vo. 77 (1957) p. 645

Step B: N-methoxy-N-methyl-N'-(3-chloro-4-thiocyanophenyl) urea

A solution of 12.5 g of N-methyl-N-methoxycarbamoyl chloride (described in French Patent No. 1,585,881) in 50 cc of benzene was added at room temperature to a mixture of 15 g of 3-chloro-4-thiocyanoaniline and 11 g of triethylamine in 200 cc of benzene and the mixture was refluxed with stirring for 15 hours. The mixture was filtered to remove insolubles which were washed with benzene and the benzene phases were washed with water, N hydrochloric acid, water, N sodium hydroxide and then water until the wash waters were neutral. The benzene phases were dried over sodium sulfate and the benzene was distilled off under reduced pressure. After filtering, the precipitate was empasted with isopropyl ether and dried under reduced pressure to obtain 11 g of N-methoxy-N-methyl-N'-(3-chloro-4-thiocyanophenyl) urea melting at 90°C. The product occurred as a pale yellow solid soluble in alcohol, acetone, chloroform and benzene and insoluble in water and ether.

Analysis: $C_{10}H_{10}ClN_3O_2S$; molecular weight = 271.73
Calculated: %C 44.19 % H 3.71 %Cl 13.05 % N 15.46 %S 11.80
Found: 44.3 3.6 13.0 15.2 11.8

IR Spectrum
Presence of C = O of a disubstituted amide at 1687 $cm^{-1}$, presence of CN and presence of aromatic substituted with a hetero atom. As far as is known, this compound is not described in the literature.

EXAMPLE II

N-methoxy-N-allyl-N'-(3-chloro-4-thiocyanophenyl)urea 15 g of 3-chloro-4-thiocyano-aniline and 10 cc of anhydrous pyridine were dissolved in 75 cc of toluene and a solution of 16 g of ethyl N-methoxy-N-allylcarbamate (described in French patent No. 1,592,328) in 200 cc of toluene was added thereto. The condensation was effected in the same manner as Step B of Example I to obtain N-methoxy-N-allyl-N'-(3-chloro-4-thiocyano-phenyl)urea.

As far as is known, this compound is not described in the literature.

EXAMPLE III

N-[(3-chloro-4-thiocyanophenyl)carbamoyl]isoxazolidine

Using the procedure of Example I, 9 g of 3-chloro-4-thiocyano aniline were reacted with N-chlorocarbonylisoxazolidine (described in Belgian patent No. 733,024) in benzene in the presence of 6 g of triethylamine to form N-[(3-chloro-4-thiocyanophenyl)carbamoyl]-isoxazolidine.

As far as is known, this compound is not described in the literature.

EXAMPLE IV

A 1% pomade was prepared in a known manner from 1 g of N-methoxy-N-methyl-N'-(3-chloro-4-thiocyanophenyl)urea, 3 g of sulfonated fatty alcohol, 1 g of the cetyl ether of polyoxetheyleneglycol, 5 g of vaseline oil, 2 mg of phenyl mercuric nitrate and sufficient distilled water for a total of 100 g.

PHARMACOLOGICAL DATA

A. In Vitro Antifungal Activity in Liquid Media

The in vitro anti-fungal activity of N-methoxy-N-methyl-N'-(3-chloro-4-thiocyanophenyl) urea was determined against different strains of Candida in Sabouraud liquid Oxoid media having a pH of 5.7. The minimum inhibiting concentrations (M.I.C.) were observed after standing at 37°C for 24 hours and 48 hours and the results are reported in Table I.

TABLE I

| Pathogenic Strain | M.I.C. - γ/cc | |
| --- | --- | --- |
| | After 24 hours | After 48 hours |
| Candida albicans (7 strains) | 10 | 30 |
| Candida tropicalis (1 strain) | 40 | 100 |
| Candida krusei (2 strains) | 0.1 | 2 |

Certain strains were very sensitive to the said compound. Four strains of Candida albicans and two strains of Candida krusei were in effect inhibited by less than 0.1γ per cc of the compound and activity did not vary for the entire 24 and 48 hours of incubation. The antifungal activity against yeast forming fungus is important.

B. Local Antifungal Activity by Diffusion in Agar Media.

Strains of Candida albicans were scattered over a DST Oxoid agar media and the agar media was pierced and a circular disc of 1 cm in diameter was removed. The product to be studied in the form of a 1% pomade was introduced into the resulting cavity and the same procedure was followed with the pomade without the active ingredient as a control. The media were then placed in an oven at 37°C for 24 and 48 hours. There appeared around the cavity a circular zone of inhibition whose diameter was measured and which diameter was proportional to the activity of the studied product. From the test conditions, the inhibition zone diameter was 2.8 cm for after 48 hours of incubation when after only 24 hours. The inhibition activity was therefore important and the diffusion of the studied product contained in the pomade was very clear.

C. In Vitro Antibacterial Activity in Liquid Media.

This test was effected against various gram positive bacterial strains in Sabouraud liquid Oxoid media having a pH of 5.7 and the minimum inhibiting concentrations were determined and reported in Table II.

TABLE II

| | M.I.C. in γ/cc after | |
| --- | --- | --- |
| | 24 hr | 48 hr |
| Staphylococcus aureus Oxford | 10 | 20 |
| Staphylococcus aureus clinical | 10 | 10 |
| Staphylococcus aureus hemolytic | 60 | 100 |
| Bacillus subtilis | 40 | 40 |
| Streptococcus hemolytic | 2 | 5 |

D. Local Antibacterial Activity by Diffusion in Agar Media

The test of paragraph B was repeated with gram positive bacteria over a DST Oxoid agar media at pH: 7,4 and the results are reported in Table III.

TABLE III

| Organism | Diameter of Zone of Inhibition | |
|---|---|---|
| | After 24 hr | After 48 hr |
| Staphylococcus aureus | 2 cm | 1.4 cm |
| Bacillus subtilis | 3.4 cm | 3.4 cm |

The results of Table III show that the product in a 1% pomade diffuses well and exercises an important inhibiting activity against pathogenic gram positive bacteria.

E. Cutaneous Tolerance

N-methoxy-N-methyl-N'-(3-chloro-4-thiocyanophenyl) urea in the form of a 1% pomade was applied to the surface of about 4 square centimeters of skin of male rats weighing about 175 g once a day for 18 days after depilation and scraping with emery paper. The animals were weighed every day and the weight curve was normal. A separation of the skin effected with respect to the pomade application did not show any thickening of the skin which remained very supple. The return of the hair was rapid in all cases. An autopsy was performed on the 20th day and the organs did not present any macroscopically visible attack. The preparation was very well tolerated on prolonged local application.

F. Acute Toxicity

The acute toxicity was determined on groups of mice of the Rockland strain weighing between 20 and 22 g. N-methoxy-N-methyl-N'-(3-chloro-4-thiocyanophenyl) urea was administered orally in increasing doses and the animals were observed for 8 days. The LD $_{50}$ was 300 mg/kg.

G. Clinical Study

The efficacy of N-methyl-N-methoxy-N'-(3-chloro-4-thiocyanophenyl) urea as a 1% pomade of Example IV was tried as an antifungal therapeutic in 14 humans. Very good results were observed in 8 out of the 14 cases.

Various modifications of the compositions and method of the invention may be made without departing from the spirit or scope thereof and it is to be understood that the invention is to be limited only as defined in the appended claims.

| Sabouraud liquid Oxoid media | | |
|---|---|---|
| Pancreatic Digest of Casein (Oxoid L 42) | 5.0 | g |
| Peptic Digest of Fresh Meat (Oxoid L 49) | 5.0 | g |
| Dextrose | 20.0 | g |
| Distilled water | 1 | l |
| pH = 5.7 | | |

| DST Oxoid agar media | | |
|---|---|---|
| Protease peptone (Oxoid L 46) | 10.0 | g |
| Veal Infusion solids | 10.0 | g |
| Dextrose | 2.0 | g |
| Sodium Chloride | 3.0 | g |
| Disodium Phosphate | 2.0 | g |
| Sodium Acetate | 1.0 | g |
| Adenine Sulphate | 0.01 | g |
| Guanine Hydrochloride | 0.01 | g |
| Uracil | 0.01 | g |
| Xanthine | 0.01 | g |
| "Ionagar" n° 2 | 12.0 | g |
| Distilled water | 1 | l |
| pH = 7.4 | | |

We claim:

1. A method of treating topical bacterial or fungal infections in warm-blooded animals which comprises applying topically to an infected area of the skin or mucous of warm-blooded animals a bactericidally or antifungally effective amount of an active compound of the formula

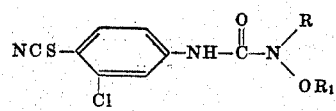

wherein R and $R_1$ can be the same or different and are selected from the group consisting of lower alkyl of one to seven carbon atoms and lower alkenyl of two to seven carbon atoms.

2. The method of claim 1 wherein the active compound is N-methoxy-N-methyl-N'-(3-chloro-4-thiocyanophenyl) urea.

3. The method of claim 1 wherein the active compound is N-methoxy-N-allyl-N'-(3-chloro-4-thiocyanophenyl)urea.

* * * * *